US011212753B2

(12) United States Patent
Wilhelmsson

(10) Patent No.: US 11,212,753 B2
(45) Date of Patent: Dec. 28, 2021

(54) TRANSMISSION POWER CONTROL

(71) Applicant: Telefonaktiebolaget LM Ericsson (publ), Stockholm (SE)

(72) Inventor: Leif Wilhelmsson, Lund (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 16/975,197

(22) PCT Filed: Mar. 6, 2018

(86) PCT No.: PCT/EP2018/055444
§ 371 (c)(1),
(2) Date: Aug. 24, 2020

(87) PCT Pub. No.: WO2019/170221
PCT Pub. Date: Sep. 12, 2019

(65) Prior Publication Data
US 2020/0413349 A1 Dec. 31, 2020

(51) Int. Cl.
*H04W 52/24* (2009.01)
*H04L 1/00* (2006.01)
(Continued)

(52) U.S. Cl.
CPC ......... *H04W 52/243* (2013.01); *H04L 1/0003* (2013.01); *H04L 1/0009* (2013.01);
(Continued)

(58) Field of Classification Search
CPC ............. H04W 52/367; H04W 52/243; H04L 1/0003; H04L 1/0009
(Continued)

(56) References Cited

U.S. PATENT DOCUMENTS 8,037,373 B2 * 10/2011 Leung ................... H04L 1/0003
714/701
8,599,748 B2 * 12/2013 Stamoulis ............... H04L 47/10
370/328

(Continued)

FOREIGN PATENT DOCUMENTS

WO 2007019012 A1 2/2007
WO 2016119839 A1 8/2016

OTHER PUBLICATIONS

PCT International Search Report, dated Oct. 18, 2018, in connection with International Application No. PCT/EP2018/055444, all pages.
(Continued)

*Primary Examiner* — John J Lee
(74) *Attorney, Agent, or Firm* — Leffler Intellectual Property Law, PLLC

(57) ABSTRACT

A method is disclosed for a wireless communication node configured for operation in accordance with a listen-before-talk (LBT) procedure. The method comprises—for an upcoming transmission—performing channel sensing to determine an interference level experienced by the wireless communication node, determining a maximum transmission power level for the upcoming transmission responsive to the determined interference level, and selecting at least one of a coding rate and a modulation to be used for the upcoming transmission responsive to the determined maximum transmission power level. According to some embodiments, the method further comprises preparing a plurality of transmission packet variants before performing the channel sensing, wherein each transmission packet variant is associated with a respective transmission power level. Then, selecting at least one of the coding rate and the modulation may comprise selecting one transmission packet variant of the plurality of transmission packet variants responsive to the determined maximum transmission power level and the
(Continued)

respective transmission power levels of the plurality of transmission packet variants. Corresponding arrangement, wireless communication node and computer program product are also disclosed.

17 Claims, 5 Drawing Sheets

(51) Int. Cl.
    *H04W 24/08*     (2009.01)
    *H04W 52/34*     (2009.01)
    *H04W 74/08*     (2009.01)

(52) U.S. Cl.
    CPC ........... *H04W 24/08* (2013.01); *H04W 52/34* (2013.01); *H04W 74/0808* (2013.01)

(58) Field of Classification Search
    USPC ... 455/522, 69, 452.1, 509, 67.11, 501, 63.1
    See application file for complete search history.

(56) References Cited

U.S. PATENT DOCUMENTS

| | | |
|---|---|---|
| 2008/0019398 A1 | 1/2008 | Genossar et al. |
| 2008/0316052 A1* | 12/2008 | Ruffini ................ H04W 52/267 |
| | | 340/901 |
| 2012/0176923 A1 | 7/2012 | Hsu et al. |
| 2013/0203458 A1 | 8/2013 | Charbit et al. |
| 2013/0343288 A1 | 12/2013 | Ratasuk et al. |
| 2016/0309420 A1 | 10/2016 | Verma et al. |
| 2017/0013479 A1 | 1/2017 | Sun et al. |
| 2018/0007643 A1* | 1/2018 | Tiirola ................ H04W 52/241 |

OTHER PUBLICATIONS

PCT Written Opinion, dated Oct. 18, 2018, in connection with International Application No. PCT/EP2018/055444, all pages.
India Office Action dated Aug. 18, 2021 in connection with India Application No. 202047039884, 5 pages.

\* cited by examiner

TRANSMISSION POWER CONTROL

TECHNICAL FIELD

The present disclosure relates generally to the field of wireless communication. More particularly, it relates to control of transmission power in wireless communication.

BACKGROUND

Co-existence approaches may be necessary, or at least beneficial, when different devices are to share a wireless communication channel. This may be true when the devices operate according to the same communication standard (e.g., IEEE 802.11) but without overall network coordination, as well as when the devices operate according to different communication standards. A particularly relevant example is when the communication channel is comprised in an unlicensed frequency band (e.g., the 2.45 GHz ISM band or one of the 5 GHz bands).

A commonly used co-existence approach is based on the principle of listen before talk (LBT), which is also known as carrier sense multiple access with collision avoidance (CSMA/CA). According to this approach, a device that intends to use the wireless communication channel for transmission senses the channel and determines whether the communication channel is busy (in use, or otherwise occupied) or idle (unoccupied). If the communication channel is determined to be busy, the transmission is deferred. If the communication channel is determined to be idle, the transmission is initiated. The approach aims to avoid collisions by only initiating transmission when the communication channel is not already used.

The sensing process is typically based on a threshold value (e.g., defined in terms of received signal power). The communication channel may be determined as idle when the sensing metric (e.g., received signal power) is below the threshold value, and may be determined as busy otherwise.

A typical consideration for selecting the threshold value is that it should be low enough for ongoing transmissions from other devices to be detected if prospect initiation of a transmission is likely to result in a collision. However, another typical consideration for selecting the threshold value is that it should be high enough for not deferring a prospect transmission when it would do no harm in terms of collisions. If the threshold value is decreased, the probability of deferring from channel access is increased. If the threshold value is increased, the probability of causing a collision is increased.

As an illustrative example, in IEEE 802.11, the power threshold value for declaring the channel to be idle is $-82$ dBm if an IEEE 802.11 preamble is detected and $-62$ dBm if no preamble, but only energy, is detected. This effectively means that when an IEEE 802.11 device is sensing the channel, it is 20 dB more aggressive towards transmitting devices not using an IEEE 802.11 preamble. The values selected in IEEE 802.11 may be seen as a compromise between the probability of unnecessarily deferring from channel access and the probability of causing a collision.

Even if the threshold value is selected with care, a suitable threshold value may typically be very situation dependent. In some approaches (e.g., as applied in IEEE 802.11ax), there is therefore an adaptive threshold value which is varied in response to a selected maximum transmission power. In such approaches, a lowered maximum transmission power may allow for a higher threshold value since the probability of causing a collision is decreased when the maximum transmission power is lowered.

US 2013/0203458 A1 discloses selection of a transmit power configuration for communication within a shared band, wherein the selection is between a low transmission power configuration applying a transmission power below a predetermined power threshold without a listen-before-talk approach and a high transmission power configuration applying a transmission power of at least the predetermined power threshold.

US 2016/0309420 A1 discloses adjusting the transmission power based on interference information, adjusting packet size when the measured error rate is different from the target error rate, and transmitting the packet according to the transmission power.

However, there still remain disadvantages of the approaches according to the prior art.

For example, if a maximum transmission power is determined and the sensing using a corresponding threshold value determines the channel to be busy, using an even lower transmission power might have proved the channel to be idle for sensing using the correspondingly higher threshold value. If the even lower transmission power would have been sufficient for a successful transmission, the capacity of the channel has been wasted in this scenario.

Furthermore, if a maximum transmission power is determined and the sensing using a corresponding threshold value determines the channel to be idle, using an even higher transmission power might also have proved the channel to be idle for sensing using the correspondingly lower threshold value. Using the even higher transmission power would typically have enabled higher data rate. Thus, the capacity of the channel has been wasted also in this scenario.

Therefore, there is a need for alternative, and preferably improved, approaches to transmission power control in association with listen-before-talk (LBT) procedures. Preferably, the alternative approaches are more efficient in terms of utilization of the channel capacity. Such efficiency may be measured in terms of one or more of: a number of unnecessary deferrals of prospect transmissions and a number of collisions.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a method for a wireless communication node configured for operation in accordance with a listen-before-talk (LBT) procedure. The method comprises—for an upcoming transmission—performing channel sensing to determine an interference level experienced by the wireless communication node, determining a maximum transmission power level for the upcoming transmission responsive to the determined interference level, and selecting at least one of a coding rate and a modulation, to be used for the upcoming transmission, responsive to the determined maximum transmission power level.

In some embodiments, the method further comprises performing the upcoming transmission by transmitting a transmission packet using the selected coding rate and/or the selected modulation.

In some embodiments, the channel sensing comprises measuring one or more of a received signal power, a received signal energy, and a received power of a predefined signature sequence.

In some embodiments, the method further comprises preparing a plurality of transmission packet variants before performing the channel sensing, wherein each transmission packet variant is associated with a respective transmission power level. Then, selecting at least one of the coding rate and the modulation may comprise selecting one transmission packet variant of the plurality of transmission packet variants responsive to the determined maximum transmission power level and the respective transmission power levels of the plurality of transmission packet variants.

In some embodiments, the selected transmission packet variant belongs to a sub-set of the plurality of transmission packet variants, each transmission packet variant of the sub-set having a respective transmission power level that is lower than, or equal to, the determined maximum transmission power level.

In some embodiments, the respective transmission power level of the selected transmission packet variant is a maximum transmission power level among the respective transmission power levels of the sub-set.

In some embodiments, each transmission packet variant is configured to provide a respective data rate, wherein the respective data rate of the selected transmission packet variant is a maximum data rate among the respective data rates of the sub-set.

In some embodiments, each transmission packet variant of the plurality of transmission packet variants is associated with a respective coding rate and a respective modulation.

In some embodiments, preparing the plurality of transmission packet variants comprises preparing each transmission packet variant using a respective one of a plurality of predefined modulation and coding schemes (MCS).

In some embodiments, preparing the plurality of transmission packet variants comprises preparing a single transmission packet using a systematic code. Then, selecting the one transmission packet variant may comprise selecting a number of parity bits of the systematic code.

In some embodiments, preparing the plurality of transmission packet variants comprises preparing a single transmission packet. Then, selecting the one transmission packet variant may comprise selecting an order of modulation.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an arrangement for a wireless communication node configured for operation in accordance with a listen-before-talk (LBT) procedure. The arrangement comprises controlling circuitry configured to cause—for an upcoming transmission—performance of channel sensing for determination of an interference level experienced by the wireless communication node, determination of a maximum transmission power level for the upcoming transmission responsive to the determined interference level, and selection of at least one of a coding rate and a modulation to be used for the upcoming transmission responsive to the determined maximum transmission power level.

A fourth aspect is a wireless communication node comprising the arrangement of the third aspect.

In some embodiments, any of the above aspects may additionally have features identical with or corresponding to any of the various features as explained above for any of the other aspects.

An advantage of some embodiments is that alternative approaches are provided to transmission power control in association with listen-before-talk (LBT) procedures.

Another advantage of some embodiments is that more efficient utilization of the channel capacity is enabled.

Yet an advantage of some embodiments is that it is possible to take instantaneous channel variations into account for the transmission power control.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In typical approaches using the principle of LBT (a.k.a. CSMA/CA), the packet is—at least partly—prepared for transmission once the maximum transmission power is set and before the actual sensing is performed. This is because the packet preparation typically takes too long time to take place in entirety after the channel has been determined to the idle. In a typical example, packet preparation before channel sensing may comprise generating the encoded packet using a modulation and coding scheme (MCS) selected based on the maximum transmission power, as well as generating and encoding the control information necessary for a receiver to decode the packet.

If the channel is determined to be idle, preparation of the packet may be finalized and the packet may be transmitted. In a typical example, finalizing packet preparation after channel sensing may comprise modulation and up-conversion to radio frequency. If the channel is determined to be busy, the preparation of the packet is typically not finalized and transmission of the packet may be deferred.

Even if an adaptive selection of the sensing threshold value based on the maximum transmission power is beneficial, there is no guarantee that the maximum transmission power is suitable to the situation at hand at the moment of sensing, thereby risking to waste channel capacity as mentioned above. For example, the MCS may not be optimized for the instantaneous channel conditions.

In the following, embodiments will be described for a wireless communication node configured for operation in accordance with a listen-before-talk (LBT) procedure. The wireless communication node may be a wireless communication device (e.g., a station, STA, or a user equipment, UE) or a network node (e.g., and access point, AP, or a base station, BS). In the embodiments, described herein, channel sensing is performed before determination of a maximum power level, and the maximum power level is determined based on the result of the channel sensing. Thereby, the maximum power level is adapted based on the actual channel conditions and the above-mentioned waste of channel capacity may be mitigated, at least partly.

Figure 1:
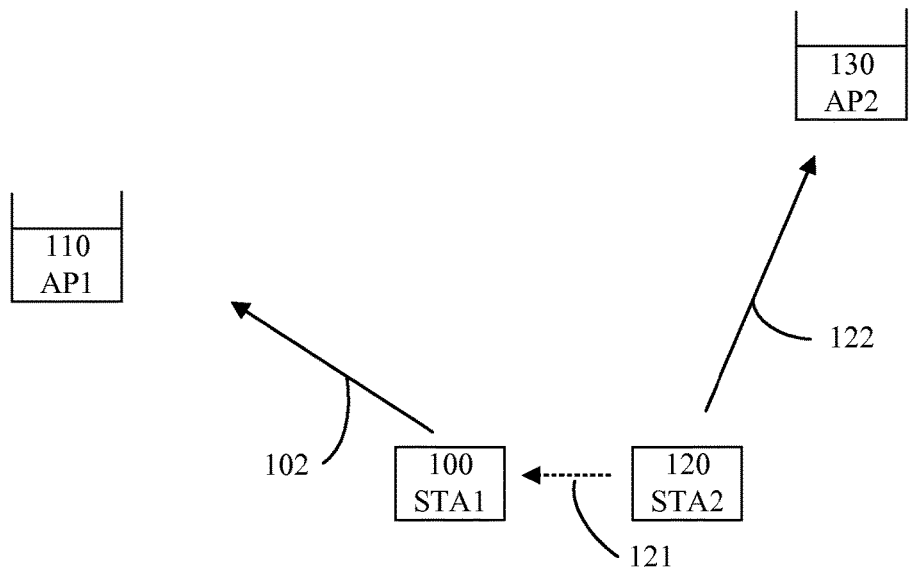
FIG. 1 is a schematic drawing illustrating an example scenario where some embodiments may be applicable.

FIG. 1 schematically illustrates an example scenario where some embodiments may be applicable. A wireless communication device (STA1) 100 is preparing for a prospect (upcoming) transmission 102 to a network node (AP1) 110. Another wireless communication device (STA2) 120 is transmitting 122 to another network node (AP2) 130. When STA1 senses the channel in preparation for the prospect transmission 102, it can determine a level of interference, illustrated at 121, caused by the transmission 122 of STA2. Alternatively or additionally, similar considerations may apply to other sources of interference (e.g. other STAs than STA2 and/or APs).

Figure 2:
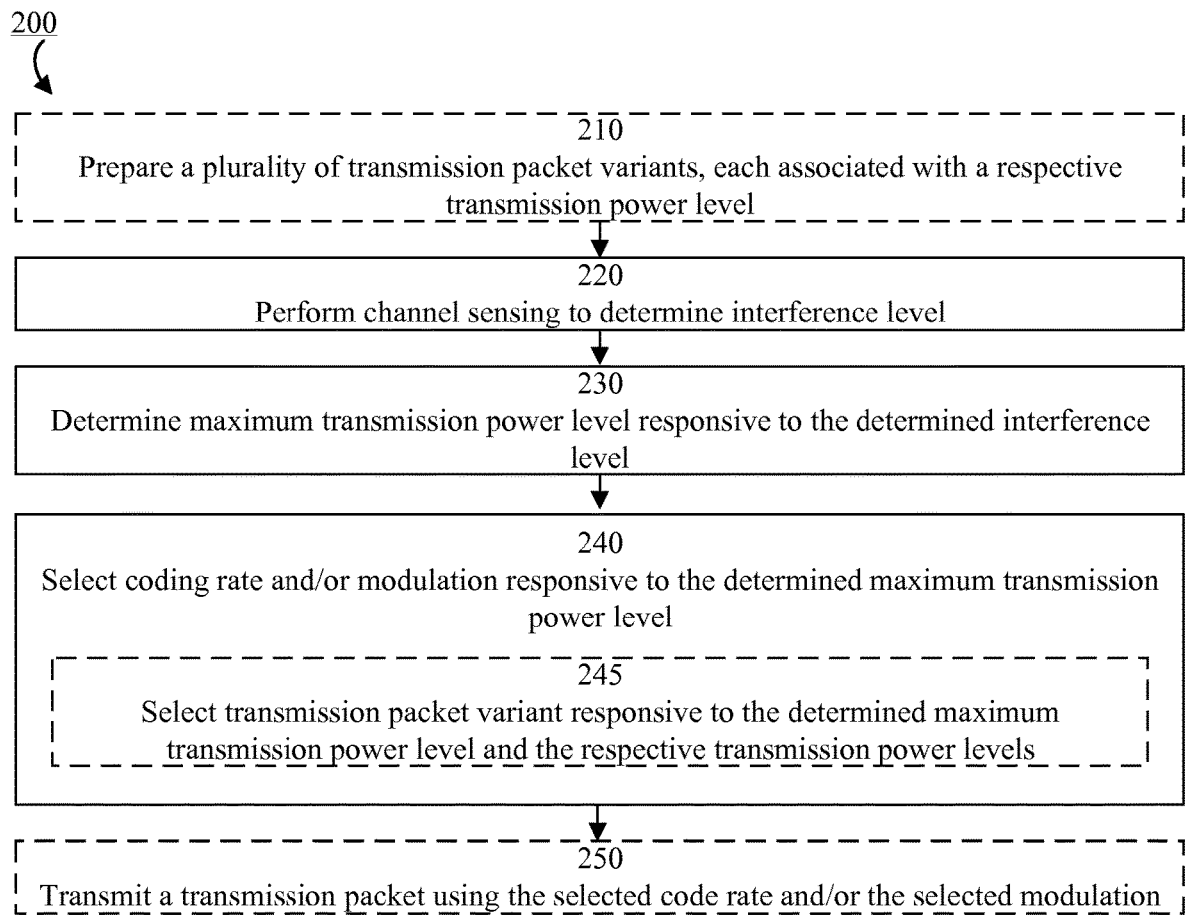
FIG. 2 is a flowchart illustrating example method steps according to some embodiments.

FIG. 2 illustrates a method 200 according to some embodiments. The method 200 may typically be performed by a wireless communication node. For example the wireless communication node may be a wireless communication device (e.g., STA1 of FIG. 1) or a network node (e.g., AP1 of FIG. 1).

In step 220, channel sensing is performed for an upcoming transmission to determine an interference level experienced by the wireless communication node. The channel sensing may be performed in any suitable way and may use any suitable metric to quantify the interference level. For example, the channel sensing may comprise measuring received signal strength in terms of received signal power, received signal energy, or received power of a predefined signature sequence (e.g., preamble detection).

It should be noted that, in contrast to approaches of the prior art, the channel sensing typically does not involve comparing the determined interference level to a threshold value to determine the channel to be idle or busy. Instead, the method proceeds to step 230 where a maximum (allowable/permitted) transmission power level for the upcoming transmission is determined responsive to the determined interference level.

Typically, the maximum transmission power level is determined such that, if the maximum transmission power level were to result in a corresponding threshold level for sensing, the determined interference level would result in the channel being determined as idle in a sensing approach according to the prior art. Additionally, the maximum transmission power level may be determined as a highest transmission power level fulfilling this condition.

In some embodiments, the maximum transmission power level is determined in step 230 by selection of one maximum transmission power level from a limited plurality of maximum transmission power levels.

In step 240, at least one of a coding rate and a modulation, to be used for the upcoming transmission, is selected responsive to the determined maximum transmission power level.

In some scenarios, the determined interference level may be so high that it is not possible (or feasible) to find a maximum transmission power level that fulfils the condition above for enabling idle channel determination (or any other suitable condition). One example is when the limited plurality of maximum transmission power levels does not comprise any maximum transmission power level that fulfills the condition. In such scenarios, step 230 may comprise determining the maximum transmission power level to zero and deferring or refraining from the upcoming transmission.

However, in many scenarios it is possible (and feasible) to find a maximum transmission power level that fulfils the condition above for enabling idle channel determination (or any other suitable condition). Then, the method may proceed to step 250, where the upcoming transmission is performed by transmitting a transmission packet, at a transmission power which is not higher than the determined maximum transmission power level, using the selected coding rate and/or the selected modulation.

In some embodiments, the method 200 may comprise preparing a plurality of (e.g., two or more) transmission packet variants before performing the channel sensing, as illustrated by optional step 210. Then, each transmission packet variant is associated with a respective transmission power level, thereby forming a limited plurality of maximum transmission power levels. The respective transmission power levels may be different for all of the transmission packet variants of the plurality, or they may coincide for some of the transmission packet variants.

Typically, all of the transmission packet variants of the plurality of transmission packet variants have the same payload and are associated with a respective coding rate and/or a respective modulation resulting in the respective transmission power level. The respective coding rate and/or respective modulation may be different for all the transmission packet variants of the plurality of transmission packet variants, or may be the same for some of the transmission packet variants of the plurality of transmission packet variants.

Thus, selecting at least one of the coding rate and the modulation in step 240 may comprise selecting one transmission packet variant of the plurality of transmission packet variants, as illustrated in optional sub-step 245, responsive to the determined maximum transmission power level and the respective transmission power levels of the plurality of transmission packet variants.

The selected transmission packet variant may belong to a sub-set of the plurality of transmission packet variants, each transmission packet variant of the sub-set having a respective transmission power level that is lower than, or equal to, the determined maximum transmission power level.

Typically, a selection condition may be that the respective transmission power level of the selected transmission packet variant is a maximum transmission power level among the respective transmission power levels of the sub-set.

Alternatively or additionally, if each transmission packet variant is configured to provide a respective data rate, a selection condition may be that the respective data rate of the selected transmission packet variant is a maximum data rate among the respective data rates of the sub-set. The respective data rates may be different data rates for all the transmission packet variants of the plurality of transmission packet variants, or may be the same data rate for some of the transmission packet variants of the plurality of transmission packet variants.

In a typical example, a plurality of transmission packet variants is prepared in step 210, each according to respective coding rate and/or modulation which result in respective transmission power levels of the transmission packet variants. The interference level determined in step 220 is then used to select one of the transmission packet variants (thereby selecting coding rate and/or modulation according to step 240). This selection is made via step 230; under the condition that the selected one of the transmission packet variants should have a respective transmission power levels which is lower than a maximum transmission power level, wherein the maximum transmission power level is associated with an idle determination of a channel having the determined interference level. Typically, the selected one of the transmission packet variants should have the highest respective transmission power level among the transmission packet variants that fulfil the condition.

Preparing the plurality of transmission packet variants may comprise performing forward error correction (FEC) encoding, interleaving, and adding preamble, for example. Step 250 may comprise deriving the transmission packet from the selected transmission packet variant. Deriving the transmission packet may comprise performing modulation and adding control information, for example.

Figure 3:
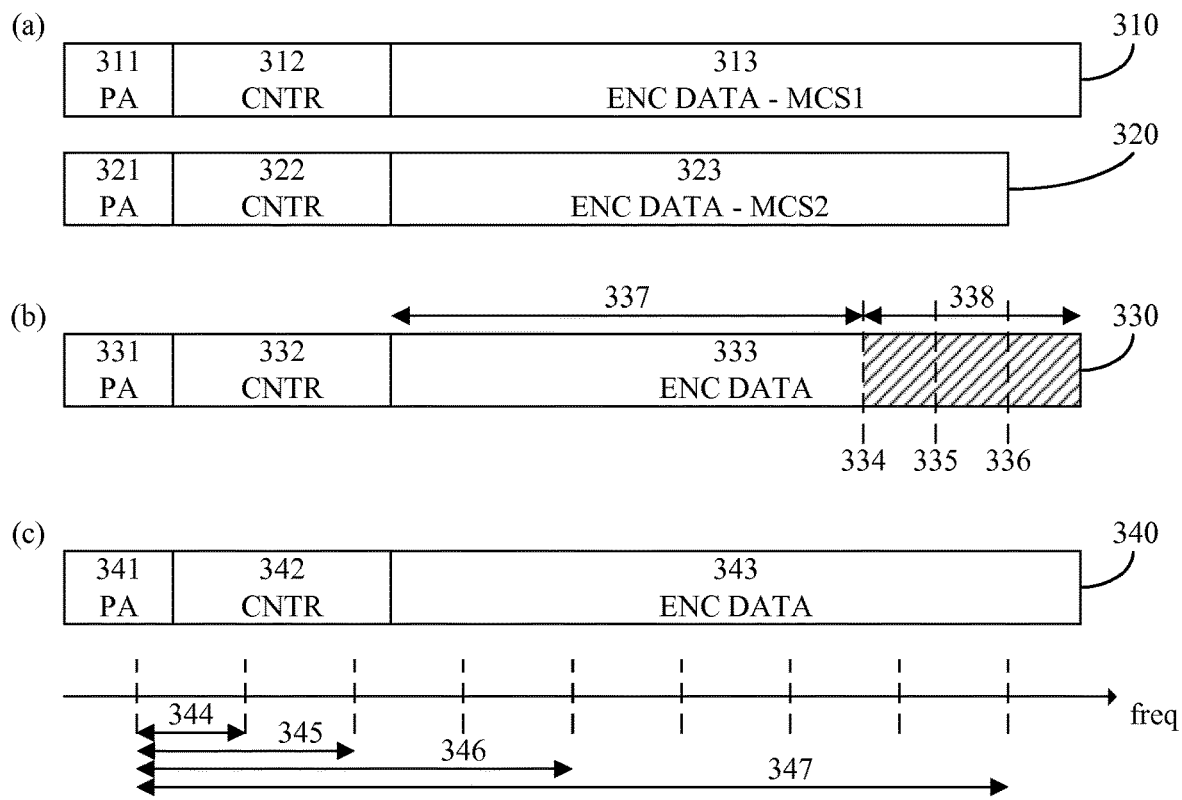
FIG. 3 is a schematic drawing illustrating examples of transmission packet variants according to some embodiments.

FIG. 3 is a schematic drawing illustrating three examples (a, b, c) of pluralities of transmission packet variants according to some embodiments.

FIG. 3(*a*) illustrates an approach wherein preparing the plurality of transmission packet variants comprises preparing each transmission packet variant using a respective one of a plurality of predefined modulation and coding schemes (MCS). In this approach, step 240 of FIG. 2 may comprise selecting one of the prepared transmission packet variants. Typically, at least some of the transmission packet variants in the plurality of transmission packet variants may have different length in time as illustrated in FIG. 3(*a*).

In the example of FIG. 3(*a*), the plurality of transmission packet variants comprises two transmission packet variants 310, 320. The transmission packet variant 310 has a preamble (PA) 311, a control part (CNTR) 312, and a payload part 313, wherein the payload part comprises data encoded (ENC DATA) using a first modulation and coding scheme (MCS1). The transmission packet variant 320 has a preamble (PA) 321, a control part (CNTR) 322, and a payload part 323, wherein the payload part comprises data encoded (ENC DATA) using a second modulation and coding scheme (MCS2).

In another example, three different packets may be prepared using MCS0, MCS4, and MCS7. Then, the channel is sensed and the following rules are applied for selecting which ones of the packets should be transmitted based on the maximum transmission power level (max TX power):

Max TX power 15 dB or more=>Transmit packet with MCS7

Max TX power less than 15 dBm but 6 dBm or more=>Transmit packet with MCS4

Max TX power less than 6 dBm but −6 dBm or more=>Transmit packet with MCS0

Max TX power less than −6 dBm or more=>Defer from transmission

As exemplified in FIG. 3(*a*), a complete packet may typically comprise more than just the encoded data 313, 323.

Typically, some kind of preamble 311, 321 is pre-appended to the data. The preamble may, for example, be needed for time synchronization, frequency estimation, and channel estimation. Such a preamble may be very simple to generate, in which case generation can be done on the fly, or it may also be generated ahead of time.

In addition, a packet typically also contains some kind of control information 312, 322 necessary for proper reception of the packet. Such control information may typically contain information regarding what MCS is used and the size of the packet.

Generally, the number of packets that is prepared before the channel is sensed may be a trade-off between performance and complexity. To optimize the channel usage—which may be seen as an example of a measure of performance—even more, a packet for each one of the available MCSs may be prepared. On the other hand, the number of prepared packet may be limited for complexity reasons.

FIG. 3(*b*) illustrates an approach wherein preparing the plurality of transmission packet variants comprises preparing a single transmission packet using a systematic code. In this approach, step 240 of FIG. 2 may comprise selecting a number of parity bits of the systematic code. Thus, the plurality of transmission packet variants is formed by using different numbers of parity bits of the single transmission packet. Thereby, the transmission packet variants in the plurality of transmission packet variants inherently have different length in time.

In the example of FIG. 3(*b*), the single transmission packet 330 has a preamble (PA) 331, a control part (CNTR) 332, and a payload part 333, wherein the payload part comprises data encoded (ENC DATA) using a systematic code. Thereby the encoded data comprises a first part 337 of information bits and a second part 338 of parity bits. The selection of step 240 may comprise using the entire single transmission packet 330, or using a part of the single transmission packet 330, wherein some of the parity bits are removed (truncating at 335 or 336) or all of the parity bits are removed (truncating at 334). Thus, in the example of FIG. 3(*b*), the plurality of transmission packet variants comprises four transmission packet variants. The plurality of transmission packet variants in this example may typically, but not necessarily, use the same modulation.

FIG. 3(c) illustrates an approach wherein preparing the plurality of transmission packet variants comprises preparing a single transmission packet. In this approach, step 240 of FIG. 2 may comprise selecting an order of modulation. Thus, the plurality of transmission packet variants is formed by using different order of modulation for modulating the single transmission packet. Thereby, the transmission packet variants in the plurality of transmission packet variants typically have the same length in time, but different bandwidths. Thereby, this approach is particularly suitable for multiplexing users in frequency (e.g., in a system using orthogonal frequency division multiplexing, OFDM).

In the example of FIG. 3(c), the single transmission packet 340 has a preamble (PA) 341, a control part (CNTR) 342, and a payload part 343, wherein the payload part comprises encoded data (ENC DATA). The selection of step 240 may comprise using the entire single transmission packet 340, modulated using different orders of modulation. The different orders of modulation typically result in different bandwidths 344, 345, 346, 347 (for example, corresponding to 256QAM—quadrature amplitude modulation, 16QAM, QPSK—quadrature phase shift keying, and BPSK—binary phase shift keying, respectively). Thus, in the example of FIG. 3(c), the plurality of transmission packet variants comprises four transmission packet variants.

In a specific example, a data packet is encoded using the same code and the modulation is selected based on what maximum transmission power level can be used. The channel is sensed and the following rules are applied for selecting which how the packet should be modulated before transmission based on the maximum transmission power level (max TX power):

Max TX power 15 dBm or more=>256-QAM
Max TX power less than 15 dBm but 10 dBm or more=>16-QAM
Max TX power less than 10 dBm but 5 dBm or more=>QPSK
Max TX power less than 5 dBm or more=>BPSK Since 256-QAM carries 8 bits of information in one symbol, 16-QAM carries 4 bits of information in one symbol, QPSK carries 2 bits of information in one symbol, and BPSK carries one bit of information in one symbol, the bandwidth is preferably selected correspondingly.

If orthogonal frequency division multiple access (OFDMA) is used and the smallest bandwidth of a resource unit (RU) is 2 MHz, the number of allocated RUs for the transmission of a packet may be based on the maximum transmission power level that can be used according to the interference level determined from the channel sensing. Continuing the numerical example above, this may be manifested as follows:

Max TX power 15 dBm or more=>1 RU
Max TX power less than 15 dBm but 10 dBm or more=>2 RUs
Max TX power less than 10 dBm but 5 dBm or more=>4 RUs
Max TX power less than 5 dBm or more=>8 RUs Thus, according to these embodiments, a smaller bandwidth can be used when a higher maximum transmission power level can be used, allowing for more concurrent transmissions to other users via frequency multiplexing in OFDMA.

Figure 4:
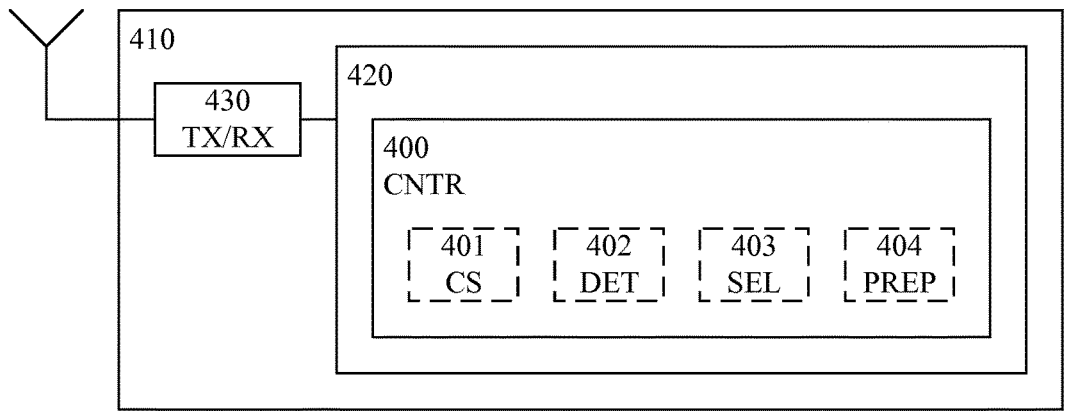
FIG. 4 is a schematic block diagram illustrating an example arrangement according to some embodiments.

FIG. 4 schematically illustrates an example arrangement 420 according to some embodiments. The example arrangement may, for example, be comprised in a wireless communication node 410 configured for operation in accordance with a listen-before-talk (LBT) procedure. The example arrangement may be configured to cause performance of the method as described in connection with FIG. 2. For example, the example arrangement may be configured to perform the method as described in connection with FIG. 2.

The arrangement comprises controlling circuitry (CNTR) 400 configured to cause—for an upcoming transmission—performance of channel sensing for determination of an interference level experienced by the wireless communication node (compare with step 220 of FIG. 2), determination of a maximum transmission power level for the upcoming transmission responsive to the determined interference level (compare with step 230 of FIG. 2), and selection of at least one of a coding rate and a modulation, to be used for the upcoming transmission, responsive to the determined maximum transmission power level (compare with step 240 of FIG. 2).

To this end the controlling circuitry 400 may comprise, or be otherwise associated with, one or more of: channel sensing circuitry (CS) 401, determination circuitry (DET) 402, and selection circuitry (SEL) 403. The channel sensing circuitry 401 may be configured to perform channel sensing for determination of an interference level experienced by the wireless communication node. The determination circuitry 402 may be configured to determine a maximum transmission power level for the upcoming transmission responsive to the determined interference level. The selection circuitry 403 may be configured to select at least one of a coding rate and a modulation, to be used for the upcoming transmission, responsive to the determined maximum transmission power level.

The controlling circuitry may be further configured to cause preparation of a plurality of transmission packet variants (compare with step 210 of FIG. 2) before performance of the channel sensing. To this end the controlling circuitry 400 may comprise, or be otherwise associated with, preparation circuitry (PREP) 404 configured to prepare the plurality of transmission packet variants.

The controlling circuitry may be further configured to cause transmission of a transmission packet (compare with step 250 of FIG. 2). To this end the controlling circuitry 400 may be associated with transmission circuitry (e.g., a transmitter; illustrated in FIG. 4 as a transceiver, TX/RX) 430 configured to transmit the transmission packet.

Some embodiments provide methods and apparatuses for using optimum transmission power in an LBT system. The methods and apparatuses may be suitable for transmission of packets in situations where it is unknown, when the packet is formatted, what transmit power can be used. Approaches are provided that enable efficient on-the-fly tailoring of a transmit packet to the appropriate transmit power level, even when most of the, or even the entire, baseband processing may need to be performed before the appropriate transmit power level is known (i.e., before the channel sensing). Embodiments enable postponement of the selection of which packet form to transmit until after it is known what transmit power level can be used.

According to some embodiments, a listen before talk scheme may be applied where the conventional trade-off between low probability of accessing the channel with high transmission power and high probability of accessing the channel with a low transmission power is avoided. By using an approach which adapts to the instantaneous channel conditions, the probability of accessing the channel using a relatively large transmission power is increased, and thereby the system performance is enhanced.

When transmitting data over a wireless channel, it is typically desired to transmit at a rate as high as possible, while ensuring a high probability that the receiver is able to correctly decode the transmitted data. If an unnecessarily low data rate is used, the capacity of the channel is wasted; which may, for instance, result in that the channel occupancy is unnecessary large (thereby wasting capacity). If a too high data rate is used, the packet cannot be correctly decoded and must be retransmitted (thereby wasting capacity).

In systems operating in an unlicensed band, and whose channel access is based on the principle of listen before talk (LBT; a.k.a. CSMA/CA), the transmission of information is typically challenging. Reasons for this include that it may take relatively long time to obtain channel access, and that the interference conditions may be highly varying.

In order to access the channel under LBT, the channel must first be determined to be idle. Once the channel has been determined to be idle, the device having a packet for transmission may start to contend for the channel. The contention for the channel is typically based on a mechanism including random back-off, which is intended to reduce the probability that two or more devices that have data to send initiate transmission at the same time; resulting in a collision. If the channel is determined to be busy, the device waits for the channel to become idle in order to perform the procedure described above. In situations with many ongoing transmissions from several overlapping networks, there is a high probability that the channel will very often be determined to be busy, which means that a device will have to wait for a long time just to start contending for the channel.

In many practical situations it may be unnecessary to wait for the channel to be determined to be idle. Specifically, it may in many situations be possible to access the channel and transmit a packet successfully without ruining the already ongoing detected transmission if a proper transmission power level is used. To obtain high aggregate throughput when several cells are overlapping and interfering with one another, one approach may be to not transmit at a higher power level than necessary; thus reducing the overall interference and enabling concurrent transmission.

The inventor has realised that sensing the channel first and comparing the received signal power with a pre-determined threshold may not be a good approach for accessing the channel in an effective way when the interfering signal power is varying. Instead, the reversed order may be used. Specifically, instead of selecting a sensing threshold value based on a determined transmission power level, a maximum allowable transmission power level may be based on the experienced interference power level. Thereby, channel access can (in principle) always be ensured by application of a low enough transmission power level. In practice, there will however most likely be a lower limit for the transmission power, below which channel access makes no sense. When the interference level is so high that the maximum allowable transmission power level is below this lower limit, the channel may simply not be accessed in accordance with some embodiments.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or specialized circuitry may, for example, be associated with or comprised in an apparatus such as a wireless communication device or a network node (e.g., an access point; a base station).

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 5:
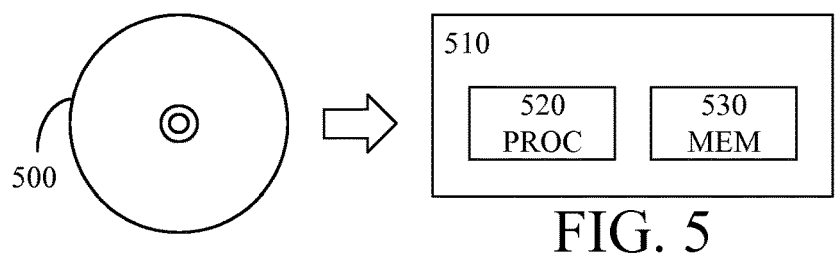
FIG. 5 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a wireless communication device or a network node 510. When loaded into the data processing unit, the computer program may be stored in a memory (MEM) 530 associated with or comprised in the data-processing unit. According to some embodiments, the computer program may, when loaded into and run by the data processing unit, cause execution of method steps according to, for example, the method illustrated in FIG. 2 or otherwise described herein.

Figure 6:
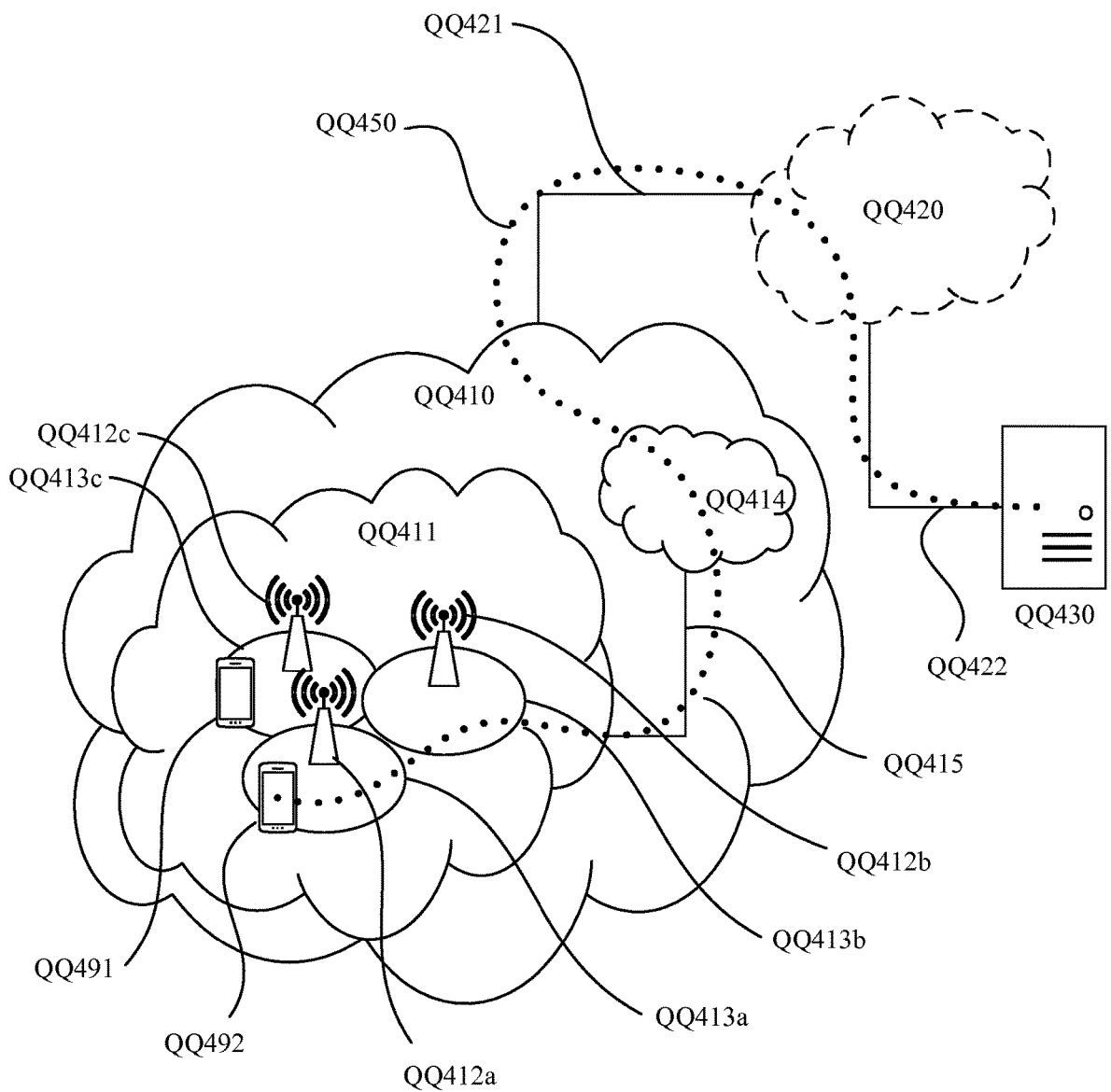
FIG. 6 illustrates a telecommunication network connected via an intermediate network to a host computer in accordance with some embodiments.

With reference to FIG. 6, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 6 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 7. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 7) served by base station QQ520. Communication interface QQ526 may be configured to facilitate connection QQ560 to host computer QQ510. Connection QQ560 may be direct or it may pass through a core network (not shown in FIG. 7) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 7:
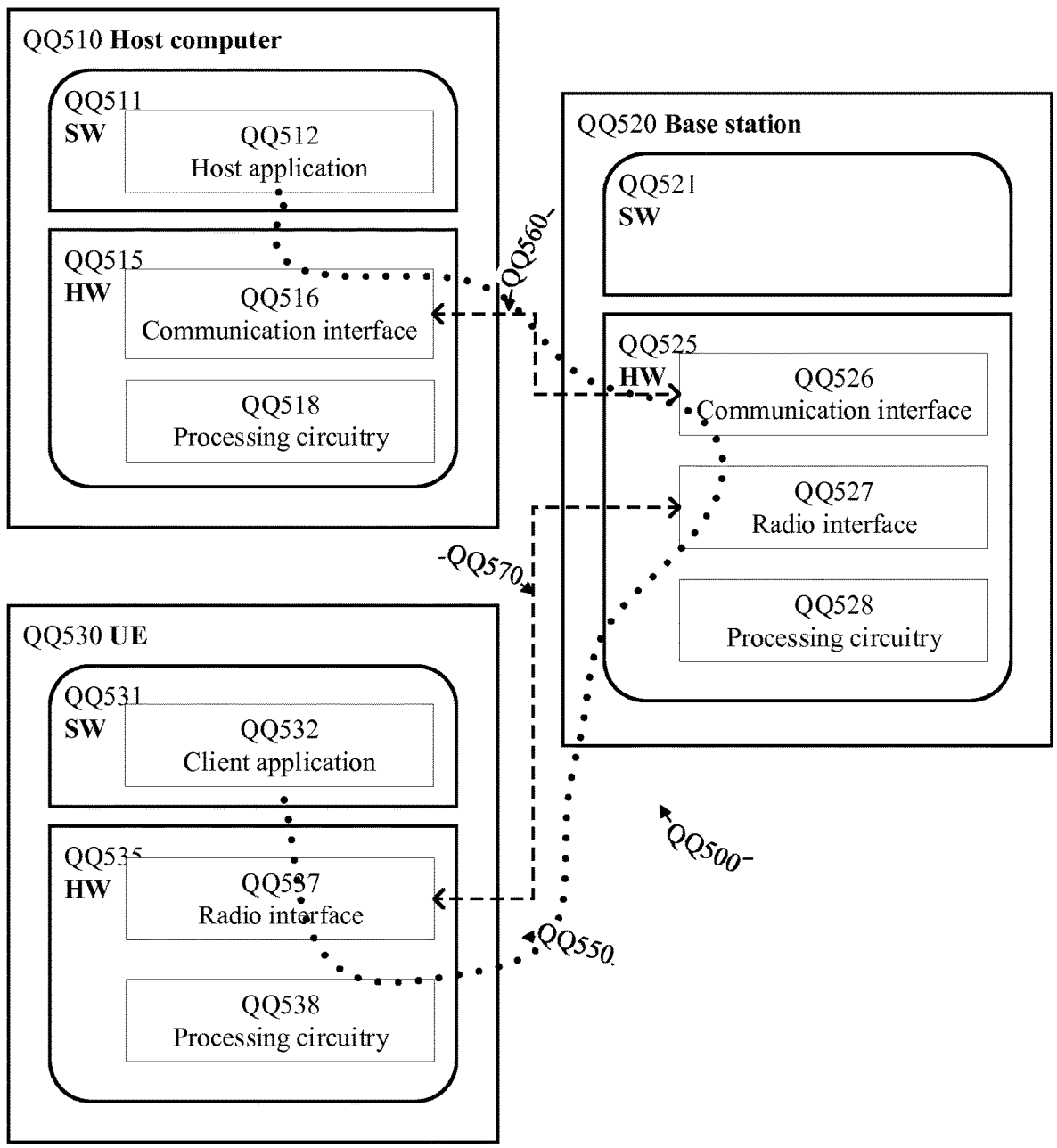
FIG. 7 illustrates a host computer communicating via a base station with a user equipment over a partially wireless connection in accordance with some embodiments.

It is noted that host computer QQ510, base station QQ520 and UE QQ530 illustrated in FIG. 7 may be similar or identical to host computer QQ430, one of base stations QQ412a, QQ412b, QQ412c and one of UEs QQ491, QQ492 of FIG. 6, respectively. This is to say, the inner workings of these entities may be as shown in FIG. 7 and independently, the surrounding network topology may be that of FIG. 6.

In FIG. 7, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the utilization of the channel capacity and thereby provide benefits such as improved system performance.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 8:
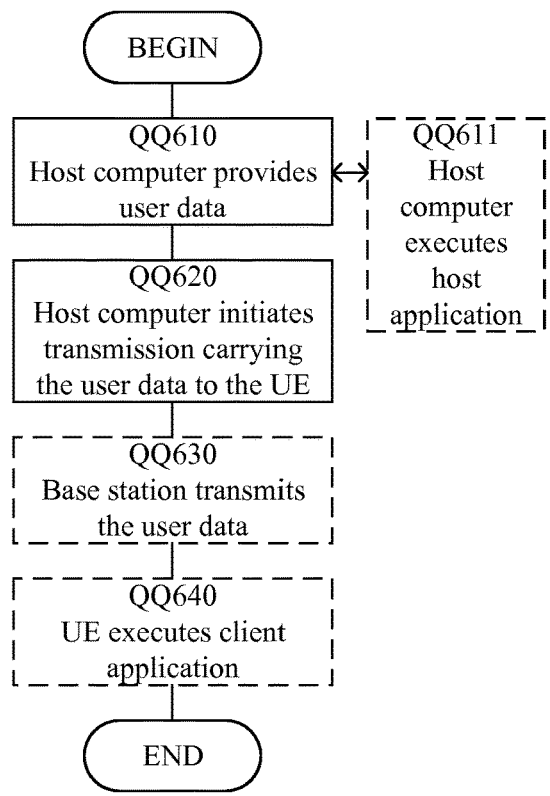
FIG. 8 is a flowchart illustrating example method steps implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 9:
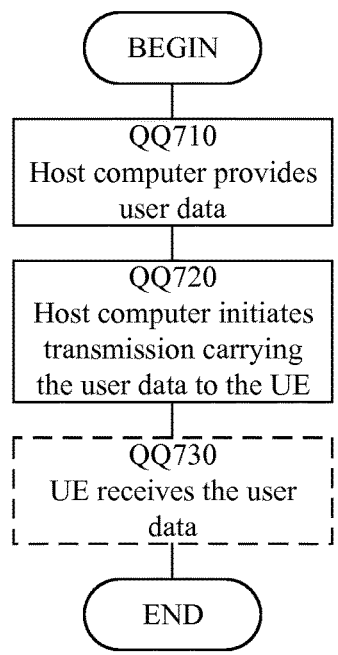
FIG. 9 is a flowchart illustrating example method steps implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 10:
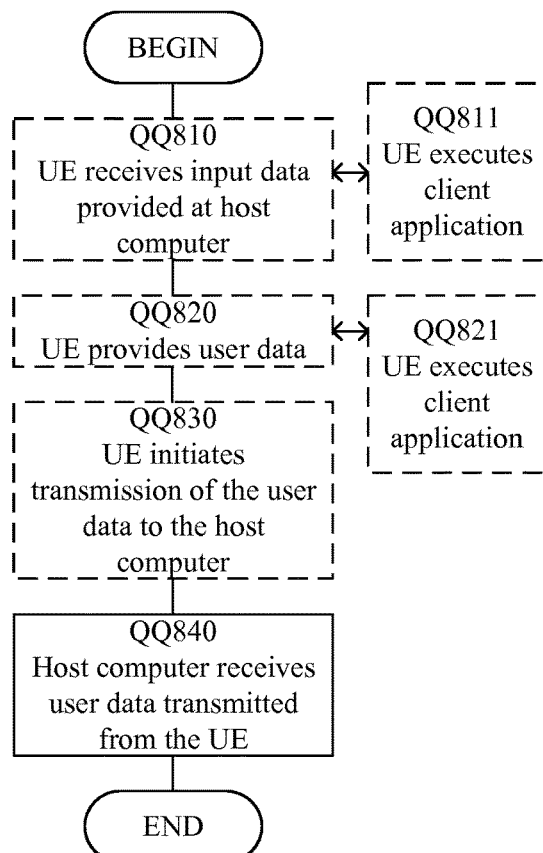
FIG. 10 is a flowchart illustrating example method steps implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 11:
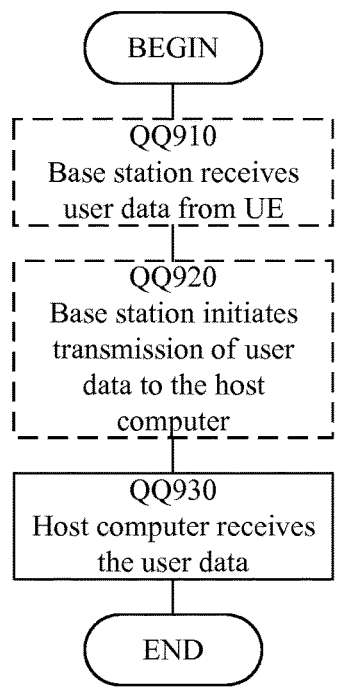
FIG. 11 is a flowchart illustrating example method steps implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group A Embodiments

A1. A method for transmit power control performed by a wireless device configured for operation in accordance with a listen-before-talk, LBT, procedure, the method comprising, for an upcoming transmission:
  performing (220) channel sensing to determine an interference level experienced by the wireless communication node;
  determining (230) a maximum transmission power level for the upcoming transmission responsive to the determined interference level; and
  selecting (240) at least one of a coding rate and a modulation, to be used for the upcoming transmission, responsive to the determined maximum transmission power level.

A2. The method of any of the previous embodiments in Group A, further comprising:
  providing user data; and
  forwarding the user data to a host computer via the transmission to the base station.

Group B Embodiments

B1. A method for transmit power control performed by a base station, the method comprising, for an upcoming transmission:
  performing (220) channel sensing to determine an interference level experienced by the wireless communication node;
  determining (230) a maximum transmission power level for the upcoming transmission responsive to the determined interference level; and
  selecting (240) at least one of a coding rate and a modulation, to be used for the upcoming transmission, responsive to the determined maximum transmission power level.

B2. The method of any of the previous embodiments in Group B, further comprising:
  obtaining user data; and
  forwarding the user data to a host computer or a wireless device.

Group C Embodiments

C1. A wireless device for transmit power control, the wireless device comprising:
  processing circuitry configured to perform any of the steps of any of the Group A embodiments; and
  power supply circuitry configured to supply power to the wireless device.

C2. A base station for transmit power control, the base station comprising:
  processing circuitry configured to perform any of the steps of any of the Group B embodiments;
  power supply circuitry configured to supply power to the base station.

C3. A user equipment (UE) for transmit power control, the UE comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

Group D Embodiments

D1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
  the processing circuitry of the host computer is configured to execute a host application, thereby providing the user data; and
  the UE comprises processing circuitry configured to execute a client application associated with the host application.

D5. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform the method of any of embodiments D5 through D7.

D9. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps described for the Group A embodiments.

D10. The communication system of embodiment D9, wherein the cellular network further includes a base station configured to communicate with the UE.

D11. The communication system of any of embodiments D9 through D10, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps described for the Group A embodiments.

D13. The method of embodiment D12, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps described for the Group A embodiments.

D15. The communication system of embodiment D14, further including the UE.

D16. The communication system of any of embodiments D14 through D15, further including the base station, wherein the base station comprises a radio interface configured to communicate with the UE and a communication interface configured to forward to the host computer the user data carried by a transmission from the UE to the base station.

D17. The communication system of any of embodiments D14 through D16, wherein:
the processing circuitry of the host computer is configured to execute a host application; and
the UE's processing circuitry is configured to execute a client application associated with the host application, thereby providing the user data.

D18. The communication system of any of embodiments D14 through D17, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps described for the Group A embodiments.

D20. The method of embodiment D19, further comprising, at the UE, providing the user data to the base station.

D21. The method of any of embodiments D19 through D20, further comprising:
at the UE, executing a client application, thereby providing the user data to be transmitted; and
at the host computer, executing a host application associated with the client application.

D22. The method of any of embodiments D19 through D21, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A user equipment (UE) configured to communicate with a base station, the UE comprising a radio interface and processing circuitry configured to perform the method of any of embodiments D19 through D22.

D24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D25. The communication system of embodiment D24 further including the base station.

D26. The communication system of any of embodiments D24 through D25, further including the UE, wherein the UE is configured to communicate with the base station.

D27. The communication system of any of embodiments D24 through D25, wherein:
the processing circuitry of the host computer is configured to execute a host application;
the UE is configured to execute a client application associated with the host application, thereby providing the user data to be received by the host computer.

D28. A method implemented in a communication system including a host computer, a base station and a user equipment (UE), the method comprising:
at the host computer, receiving, from the base station, user data originating from a transmission which the base station has received from the UE, wherein the UE performs any of the steps described for the Group A embodiments.

D29. The method of embodiment D28, further comprising at the base station, receiving the user data from the UE.

D30. The method of any of embodiments D28 through D29, further comprising at the base station, initiating a transmission of the received user data to the host computer.

D31. A method implemented in a communication system including a host computer, a base station and a user equipment (UE), the method comprising:
at the host computer, receiving, from the base station, user data originating from a transmission which the base station has received from the UE, wherein the base station performs any of the steps described for the Group B embodiments.

D32. The method of embodiment D31, further comprising at the base station, receiving the user data from the UE.

D33. The method of any of embodiments D31 through D32, further comprising at the base station, initiating a transmission of the received user data to the host computer.

The invention claimed is:

1. A method for a wireless communication node configured for operation in accordance with a listen-before-talk (LBT) procedure, the method comprising, for an upcoming transmission:
performing channel sensing to determine an interference level experienced by the wireless communication node;

determining a maximum transmission power level for the upcoming transmission responsive to the determined interference level;
selecting at least one of a coding rate and a modulation, to be used for the upcoming transmission, responsive to the determined maximum transmission power level; and
preparing a plurality of transmission packet variants before performing the channel sensing, wherein each transmission packet variant is associated with a respective transmission power level, and wherein selecting at least one of the coding rate and the modulation comprises selecting one transmission packet variant of the plurality of transmission packet variants responsive to the determined maximum transmission power level and the respective transmission power levels of the plurality of transmission packet variants.

2. The method of claim 1, further comprising performing the upcoming transmission by transmitting a transmission packet using the selected coding rate and/or the selected modulation.

3. The method of claim 1, wherein the channel sensing comprises measuring one or more of:
a received signal power;
a received signal energy; and
a received power of a predefined signature sequence.

4. The method of claim 1, wherein the selected transmission packet variant belongs to a sub-set of the plurality of transmission packet variants, each transmission packet variant of the sub-set having a respective transmission power level that is lower than, or equal to, the determined maximum transmission power level.

5. The method of claim 4, wherein the respective transmission power level of the selected transmission packet variant is a maximum transmission power level among the respective transmission power levels of the sub-set.

6. The method of claim 4, wherein each transmission packet variant is configured to provide a respective data rate, and wherein the respective data rate of the selected transmission packet variant is a maximum data rate among the respective data rates of the sub-set.

7. The method of claim 1, wherein each transmission packet variant of the plurality of transmission packet variants is associated with a respective coding rate and a respective modulation.

8. The method of claim 7, wherein preparing the plurality of transmission packet variants comprises preparing each transmission packet variant using a respective one of a plurality of predefined modulation and coding schemes (MCSs).

9. The method of claim 7, wherein preparing the plurality of transmission packet variants comprises preparing a single transmission packet using a systematic code, and wherein selecting the one transmission packet variant comprises selecting a number of parity bits of the systematic code.

10. The method of claim 7, wherein preparing the plurality of transmission packet variants comprises preparing a single transmission packet, and wherein selecting the one transmission packet variant comprises selecting an order of modulation.

11. A non-transitory computer readable medium, having thereon a computer program comprising program instructions, the computer program being loadable into a data processing unit and configured to cause execution of a method when the computer program is run by the data processing unit, wherein the method is for a wireless communication node configured for operation in accordance with a listen-before-talk (LBT) procedure, the method comprising, for an upcoming transmission:
performing channel sensing to determine an interference level experienced by the wireless communication node;
determining a maximum transmission power level for the upcoming transmission responsive to the determined interference level;
selecting at least one of a coding rate and a modulation, to be used for the upcoming transmission, responsive to the determined maximum transmission power level; and
preparing a plurality of transmission packet variants before performing the channel sensing, wherein each transmission packet variant is associated with a respective transmission power level, and wherein selecting at least one of the coding rate and the modulation comprises selecting one transmission packet variant of the plurality of transmission packet variants responsive to the determined maximum transmission power level and the respective transmission power levels of the plurality of transmission packet variants.

12. An arrangement for a wireless communication node configured for operation in accordance with a listen-before-talk (LBT) procedure, the arrangement comprising controlling circuitry configured to cause, for an upcoming transmission:
performance of channel sensing for determination of an interference level experienced by the wireless communication node;
determination of a maximum transmission power level for the upcoming transmission responsive to the determined interference level;
selection of at least one of a coding rate and a modulation, to be used for the upcoming transmission, responsive to the determined maximum transmission power level; and
preparation of a plurality of transmission packet variants before performance of the channel sensing, wherein each transmission packet variant is associated with a respective transmission power level, and wherein selection of at least one of the coding rate and the modulation comprises selection of one transmission packet variant of the plurality of transmission packet variants responsive to the determined maximum transmission power level and the respective transmission power levels of the plurality of transmission packet variants.

13. The arrangement of claim 12, wherein each transmission packet variant of the plurality of transmission packet variants is associated with a respective coding rate and a respective modulation.

14. The arrangement of claim 13, wherein the controlling circuitry is configured to cause the preparation of the plurality of transmission packet variants by causing preparation of each transmission packet variant using a respective one of a plurality of predefined modulation and coding schemes (MCSs).

15. The arrangement of claim 13, wherein the controlling circuitry is configured to cause the preparation of the plurality of transmission packet variants by causing preparation of a single transmission packet using a systematic code, and wherein the controlling circuitry is configured to cause the selection of the one transmission packet variant by causing selection of a number of parity bits of the systematic code.

16. The arrangement of claim 13, wherein the controlling circuitry is configured to cause the preparation of the plurality of transmission packet variants by causing preparation of a single transmission packet, and wherein the controlling circuitry is configured to cause the selection of the one transmission packet variant by causing selection of an order of modulation.

17. A wireless communication node comprising the arrangement of claim 12.

\* \* \* \* \*